(12) United States Patent
Hirsch et al.

(10) Patent No.: US 12,116,106 B2
(45) Date of Patent: Oct. 15, 2024

(54) ROTOR BLADE WITH A SYSTEM FOR RETENTION AND FOR TAKE-UP OF SEPARATE STRESSES AND ROTOR PROVIDED WITH SUCH BLADES

(71) Applicant: AIRBUS HELICOPTERS, Marignane (FR)

(72) Inventors: Jean-Francois Hirsch, Aix en Provence (FR); Adrien Parizel, Viarmes (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/945,341

(22) Filed: Sep. 15, 2022

(65) Prior Publication Data

US 2023/0099429 A1 Mar. 30, 2023

(30) Foreign Application Priority Data

Sep. 27, 2021 (FR) ........................................ 2110165

(51) Int. Cl.
*B64C 11/24* (2006.01)
*B64C 11/06* (2006.01)

(52) U.S. Cl.
CPC .............. *B64C 11/24* (2013.01); *B64C 11/06* (2013.01)

(58) Field of Classification Search
CPC .......... B64C 11/24; B64C 11/26; B64C 11/06
See application file for complete search history.

(56) References Cited

U.S. PATENT DOCUMENTS

| 2,270,542 | A | * | 1/1942 | Martin | .................... | B64C 11/06 |
| | | | | | | 416/204 R |
| 2,765,859 | A | | 10/1956 | Hartzell et al. | | |
| 4,892,462 | A | | 1/1990 | Bianchi et al. | | |
| 4,961,687 | A | * | 10/1990 | Bost | ...................... | B29C 37/005 |
| | | | | | | 416/134 A |
| 5,017,092 | A | | 5/1991 | Violette et al. | | |
| 6,305,905 | B1 | | 10/2001 | Nagle et al. | | |
| 6,666,651 | B2 | | 12/2003 | Rust | | |

(Continued)

FOREIGN PATENT DOCUMENTS

| EP | 0296014 A1 | 12/1988 |
| EP | 2862799 A1 | 4/2015 |

(Continued)

OTHER PUBLICATIONS

French Search Report for French Application No. FR2110165, Completed by the French Patent Office, Dated May 23, 2022, 9 pages.

*Primary Examiner* — Juan G Flores
(74) *Attorney, Agent, or Firm* — Brooks Kushman P.C.

(57) ABSTRACT

A blade, for a rotor of an aircraft, comprising a hollow cylindrical sleeve, a stop fastened to the cylindrical sleeve, a profiled portion, and an anchoring device, a blade body and a hollow torsion box secured to the profiled portion. The anchoring device and the blade body are positioned inside the cylindrical sleeve. The anchoring device surrounds the stop in order to form a stop for the profiled portion parallel to a longitudinal axis of the blade. The hollow torsion box is secured to the profiled portion, and comprises a bearing zone in contact with an inner wall of the cylindrical sleeve, taking up the bending loads on the blade.

18 Claims, 3 Drawing Sheets

(56) References Cited

U.S. PATENT DOCUMENTS

| | | | |
|---|---|---|---|
| 9,085,986 B2 | 7/2015 | Bianchi et al. | |
| 9,302,764 B2 * | 4/2016 | Bianchi | B64C 11/26 |
| 2002/0008177 A1 | 1/2002 | Molette | |
| 2012/0195762 A1 * | 8/2012 | Bianchi | B64C 27/48 |
| | | | 416/214 R |
| 2013/0129507 A1 | 5/2013 | Moselage, III | |
| 2013/0336796 A1 * | 12/2013 | Carvalho | F16C 33/723 |
| | | | 29/889 |
| 2015/0330233 A1 | 11/2015 | Petellaz et al. | |
| 2021/0062661 A1 | 3/2021 | Loos | |

FOREIGN PATENT DOCUMENTS

| | | | |
|---|---|---|---|
| FR | 2970943 | A1 | 8/2012 |
| FR | 3021030 | A1 | 11/2015 |

* cited by examiner

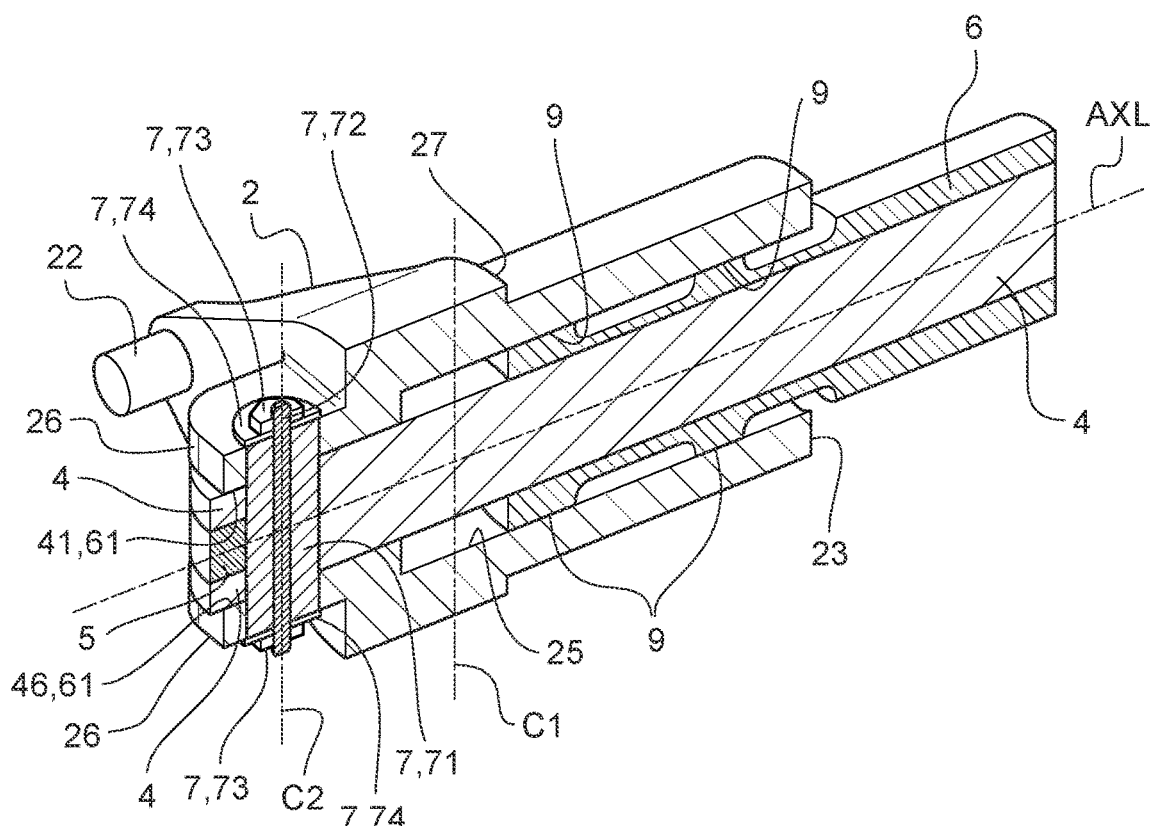
Fig.5
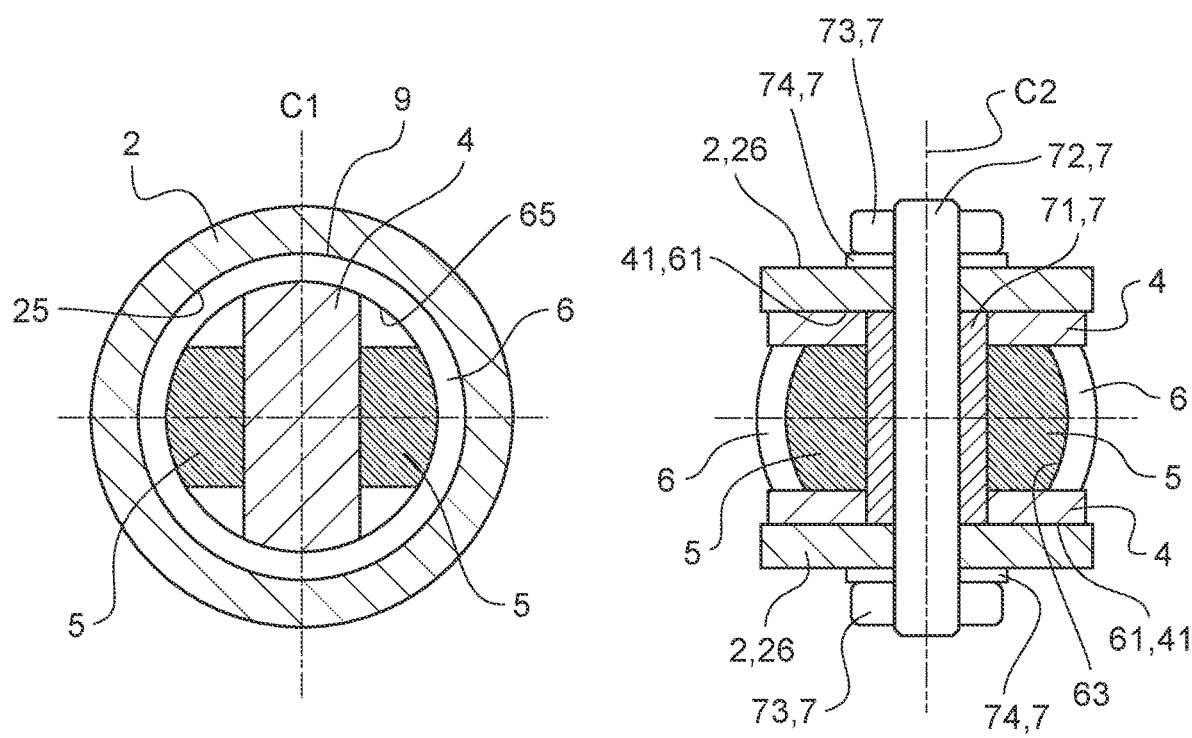
Fig.6
Fig.7

ROTOR BLADE WITH A SYSTEM FOR RETENTION AND FOR TAKE-UP OF SEPARATE STRESSES AND ROTOR PROVIDED WITH SUCH BLADES

CROSS REFERENCE TO RELATED APPLICATIONS

This application claims priority to French patent application No. FR 21 10165 filed on Sep. 27, 2021, the disclosure of which is incorporated in its entirety by reference herein.

TECHNICAL FIELD

The present disclosure belongs to the field of aircraft rotors, and in particular forward propellers of an aircraft.

The present disclosure relates to a rotor blade with a system for retention and for take-up of separate stresses and a rotor provided with such blades.

BACKGROUND

A rotor may be a lift rotor of a rotary-wing aircraft providing the lift, and indeed the propulsion, of the rotorcraft. A rotor may also be an auxiliary rotor of a rotary-wing aircraft opposing the yaw torque exerted by a lift rotor on the fuselage of this aircraft and also helping control the yaw movements of this aircraft. A rotor may further be a forward propeller, also referred to as a "propeller", for example, equipping a fixed-wing or rotary-wing aircraft. Propellers may, for example, be positioned to either side of a fuselage of the aircraft, possibly on a fixed wing of the aircraft. When the aircraft comprises a single propeller, this propeller may be positioned on the fuselage of the aircraft.

Such a rotor conventionally comprises a rotating hub and several blades mounted in the hub, the number and dimensions of the blades being dependent, in particular, on the forward force that needs to be generated.

The pitch of the blades may vary at least collectively, i.e., in an identical manner for all of the blades, so as to modify the angle of incidence of the blades in order to achieve the aerodynamic performances required of the rotor. The pitch variation is achieved, for example, by a connection with a degree of freedom to rotate, such as a pivot connection, between a blade root of each blade and the hub of the rotor.

According to well-established prior art for a propeller, such a connection with a degree of freedom to rotate comprises one or more ball bearings arranged between the hub and the blade root of the blade in order to guide the rotation of the blade about a pitch axis. The blade root also comprises a stop preventing it from moving in translation in relation to the hub in order to retain the blade when subjected to centrifugal force during rotation of the propeller.

The blade may comprise a profiled portion and a blade root provided with a cylindrical sleeve, the profiled portion being secured to the cylindrical sleeve by various means.

The profiled portion of the blade may, for example, be fastened to the cylindrical sleeve by removable fastening means, such as screws, as described in documents U.S. Pat. Nos. 2,765,859 and 6,305,905. The profiled portion may then be removed or replaced fairly easily. However, these removable fastening means take up most, if not all, of the tensile, bending and torsional stresses of the blade.

A removable fastening means between a profiled portion of a blade and a cylindrical sleeve may also be a removable pin as described in document U.S. Pat. No. 5,017,092.

A profiled portion may, for example, be fastened to the cylindrical sleeve by a non-removable retention system, in particular when the profiled portion of the blade is made from composite materials.

A non-removable retention system may, for example, comprise one or a series of undercut shapes between the cylindrical sleeve and the profiled portion, as described in documents US 2013/0129507 and U.S. Pat. No. 6,666,651. Each undercut shape constitutes a mechanical means for retaining the profiled portion of the blade on the cylindrical sleeve.

The cylindrical sleeve may also be made from metal, for example from stainless steel, and comprise a single undercut shape. The profiled portion of the blade may be bonded to the cylindrical sleeve in addition to the undercut shape. The cylindrical sleeve may in this case be referred to as a "tulip", characterizing its particular shape.

According to documents US 2002/0008177 and EP 2 862 799, a non-removable retention system may comprise a composite structure of the profiled portion of the blade wrapping around a ring in order to form a mechanical stop with the cylindrical sleeve and by means of a cylindrical part arranged inside the cylindrical sleeve and the profiled portion so as to prevent this ring from becoming deformed.

Document FR 3 021 030 relates to a blade comprising a profiled portion extending in a longitudinal direction and a sleeve. The sleeve comprises a passage restriction in a direction perpendicular to the longitudinal direction. The base of the profiled portion is fastened to the hub or to the sleeve by means of a bushing perpendicular to the longitudinal axis and has an overall space requirement strictly greater than the width of the passage restriction, meaning that, in the event of the fastening of said base with the bushing breaking, the base comes to abut against the passage restriction in order to retain the profiled portion in the sleeve.

Documents FR 2 970 943 and U.S. Pat. No. 9,085,986 describe a blade comprising a fitting for fastening to a hub and an attachment zone surrounding a bushing connected to the fitting. The blade also comprises a member for transmitting torsional stresses formed by two half-shells which together clamp the attachment zone. Each half-shell comprises a first part positioned inside the fitting and a second part cooperating with a torsion box.

Document EP 0 296 014 describes a blade made from composite materials for a shrouded rear rotor of a helicopter. The blade comprises a root loop secured to the spar of the blade surrounding an attachment bushing secured to the hub.

This securing connection between the blade and the hub of the rotor is loaded both by a tensile stress generated by the centrifugal force caused by the rotation of the blade about the axis of the rotor hub and by bending and torsional stresses resulting from the aerodynamic and inertial loads of the blade. The tensile stress comprises a force substantially parallel to the longitudinal direction of the blade.

The bending stresses may comprise forces that are not parallel to the longitudinal direction of the blade and that result from bending loads on the blade relative to the longitudinal direction of the blade due to the aerodynamic and inertial loads of the blade. The torsional stresses may comprise forces and/or one or more torques situated in a plane substantially perpendicular to the longitudinal direction of the blade, and resulting from torsional loads on the blade about the longitudinal direction of the blade due to the aerodynamic and inertial loads of the blade.

This securing connection is therefore subjected to multi-axial stresses of different natures. This securing connection does not allow these tensile, bending and torsional stresses to be distributed in an optimal manner in the components of the blade, as it is difficult for the fibers constituting the composite materials of the blade and possibly the blade root to be oriented in such a way as to simultaneously absorb all the normal and shear stresses combined with high static and fatigue loads.

The prior art relevant to the disclosure also comprises documents US 2021/0062661 and US 2013/0336796.

SUMMARY

The objects of the present disclosure are therefore a rotor blade with a system for retention and for take-up of separate stresses and a rotor provided with such blades, allowing the limitations mentioned above to be overcome by optimizing the take-up of the combined tensile, bending and torsional stresses in the components of the blade.

The present disclosure therefore relates to a blade for a rotor. This blade comprises:
 a hollow cylindrical sleeve extending around a longitudinal axis AXL and provided with an inner wall;
 a stop fastened to the cylindrical sleeve;
 a profiled portion;
 an anchoring device secured to the profiled portion; and
 a blade body secured to the profiled portion.

The blade according to the disclosure is remarkable in that:
 the blade comprises a hollow torsion box secured to the profiled portion and comprising a bearing zone in contact with the inner wall of the cylindrical sleeve;
 the anchoring device is positioned inside the cylindrical sleeve and at least partially surrounds the stop; and
 the blade body is positioned inside the cylindrical sleeve.

The blade is intended to equip a rotor comprising at least two blades and a rotating hub, each blade being connected to the hub by a connection with a degree of freedom to rotate, such as a pivot connection, in order to allow a variation in the pitch of said blade about a pitch axis substantially parallel to the longitudinal axis of the blade. The connection with a degree of freedom to rotate is more precisely positioned between the hub and the cylindrical sleeve of the blade. When the rotor rotates about the axis of rotation of the hub, the longitudinal axis of the blade substantially coincides with a radial direction of the rotating rotor.

This rotor may be a lift rotor or an auxiliary rotor of a rotary-wing aircraft. A rotor may also be a forward propeller equipping a fixed-wing or rotary-wing aircraft.

When the rotor rotates, the stop prevents the blade from moving, by means of the anchoring device, in a direction parallel to the longitudinal axis AXL, from the cylindrical sleeve towards the profiled portion. The profiled portion of the blade is thus held connected with the hub of the rotor, the centrifugal force tending to move the blade radially out of the hub, when the rotor, and therefore the blade, is rotating about an axis of rotation of the hub. The anchoring device and the stop thus take up the tensile stresses generated by the centrifugal force during rotation of the hub, and therefore the blades, about this axis of rotation of the hub.

The torsion box is positioned at least partially inside the cylindrical sleeve and, along with the cylindrical sleeve, by virtue of the bearing zone of the torsion box that is in contact with the inner wall of the cylindrical sleeve, takes up the bending stresses experienced by the blade resulting from the forces experienced by the blade during rotation of the rotor.

The torsion box is hollow and may at least partially enclose the blade body and the anchoring device. The torsion box may possibly also enclose part of a spar of the blade.

The blade body is positioned at least partially inside the torsion box and is in contact with the torsion box and the anchoring device so as to limit the deformations of the torsion box and the anchoring device.

The stop, the anchoring device, the blade body, the cylindrical sleeve and the torsion box thus constitute a system for retention and for take-up of separate stresses of the blade. This system for retention and for take-up of separate stresses therefore advantageously allows the stresses generated and experienced by the blade to be taken up separately by the elements of the blade, and of the system for retention and for take-up of separate stresses in particular.

As a result, each of the elements of the blade may be optimized in terms of dimensions, weight and mechanical strength, without compromising the operation and the mechanical resistance to stress and fatigue of the rotor as a whole.

Moreover, the profiled portion of the blade can be completely removed from the cylindrical sleeve through the use of a removable connection, for example comprising at least one screw and one nut, between the stop and the cylindrical sleeve, while ensuring the assembly remains highly secure, this removable connection being loaded mainly in shear.

The blade according to the disclosure may also comprise one or more of the following features, taken individually or in combination.

According to one example, the anchoring device is U-shaped. This U-shape allows the anchoring device to surround the stop in order to prevent the anchoring device from being released from the stop when the blade is subjected to a centrifugal force due to the rotation of the rotor. The anchoring device may thus constitute a blade winding.

According to this example, the blade body is positioned at least between the two legs of the anchoring device forming the U-shape so as to prevent these two legs from moving towards each other when the anchoring device is subjected to loads.

According to another example, the anchoring device may comprise unidirectional fibers. These fibers are thus arranged parallel to each other, for example along a U-shape of the anchoring device. These fibers may also be arranged parallel to each other, essentially parallel to the longitudinal axis. These fibers may for example comprise resin-impregnated carbon and/or glass fibers.

According to another example, the stop may comprise a cylindrical part and at least one fastening device for fastening this cylindrical part to the cylindrical sleeve. This cylindrical part may be arranged perpendicular to the longitudinal axis AXL. The cylindrical part thus cooperates with the anchoring device to form an effective and reliable stop for the anchoring device, and therefore for the profiled portion of the blade, in a direction parallel to the longitudinal axis AXL, i.e., in a radial direction of the rotor when it is rotating.

According to another example, the stop may comprise a hollow bushing secured to the anchoring device, a cylindrical part and at least one fastening device for fastening the cylindrical part to the cylindrical sleeve. The hollow bushing and the cylindrical part are arranged perpendicular to the longitudinal axis AXL. The anchoring device then at least partially surrounds the hollow bushing, and the cylindrical part is positioned in the bushing in order to connect the anchoring device to the cylindrical sleeve.

According to these two latter examples, said at least one fastening device fastens the cylindrical part to the cylindrical sleeve.

Moreover, according to these two latter examples, the components of the stop may be metal.

According to another example, the inner wall of the cylindrical sleeve may be cylindrical with a circular base and the bearing zone of the torsion box may comprise, at least partially, a cylindrical shape with a circular base cooperating with said inner wall to form a connection with a degree of freedom to rotate about the longitudinal axis AXL and with a degree of freedom to move in translation along the longitudinal axis AXL, such as a sliding pivot connection. The bearing zone of the torsion box may for example comprise a single circumferential bearing surface covering 360° around the longitudinal axis AXL or indeed several bearing surfaces distributed radially around the longitudinal axis AXL. Similarly, the bearing zone may comprise several bearing surfaces distributed longitudinally along the longitudinal axis AXL or a single bearing surface that is sufficiently long to form a "long centering" connection with the inner wall of the cylindrical sleeve.

Irrespective of the number of bearing surfaces, the bearing zone may for example comprise a part made from metal or from a polymer derivative, with or without surface treatment, in order to reduce wear at the point of contact between the inner wall of the cylindrical sleeve and the bearing zone of the torsion box.

According to another example, the torsion box, the anchoring device and/or the blade body are secured to the profiled portion. The torsion box, the anchoring device and/or the blade body may therefore be in direct continuation of the profiled portion, for example belonging to the composite structure of this profiled portion of the blade. The torsion box, the anchoring device and/or the blade body may also be fastened to the profiled portion, for example to the composite structure of this profiled portion.

According to another example, the torsion box, the anchoring device and/or the blade body are secured to at least one spar of the blade. The torsion box, the anchoring device and/or the blade body may be an integral part of this at least one spar, i.e., may be in direct continuation of this at least one spar.

According to another example, the blade body may comprise at least one flat spot and the cylindrical sleeve may comprise at least one planar face cooperating with the flat spot. This at least one planar face of the cylindrical sleeve is therefore in contact with this at least one flat spot of the blade body in order to effectively take up the torsional stresses generated by the aerodynamic forces experienced by the blade during rotation of the rotor, in particular in response to the pitch variations of the blade. These torsional stresses are transmitted from the profiled portion of the blade by the torsion box, advantageously preventing all these torsional stresses from being transmitted to a possible spar of the blade and/or to the blade body.

This at least one planar face of the cylindrical sleeve and this at least one flat spot of the blade body are preferably arranged parallel to the longitudinal axis AXL.

The cylindrical sleeve may for example comprise two planar faces and a clevis, this clevis comprising two supports each provided with a planar face. The blade body then comprises two flat spots positioned respectively in flat contact with a planar face of the clevis.

Moreover, the clevis can allow the stop to be fastened to the cylindrical sleeve. The blade body may then flank the anchoring device between the two planar faces, and therefore between the two supports of the clevis. The expression "the blade body may then flank the anchoring device between the two planar faces" means that the blade body comprises two plates each provided with a flat spot and situated to either side of the anchoring device, the blade body/anchoring device assembly being positioned between the two supports of the clevis.

In the absence of flat contact between the blade body and the cylindrical sleeve, the torsional stresses generated by the aerodynamic forces experienced by the blade during rotation of the rotor may be taken up by the stop in connection with the cylindrical sleeve. These torsional stresses are in this case transmitted from the profiled portion of the blade to the stop by the torsion box and the anchoring device, and possibly also by a spar of the blade and/or the blade body.

According to another example, the torsion box may comprise fibers oriented at angles of between ±10° and ±80° in relation to the longitudinal axis AXL. Orienting the fibers in this way allows the torsion box to have a high shear modulus. The fibers of the torsion box are oriented, for example, at ±45° in relation to the longitudinal axis AXL. The torsion box may be manufactured by winding these fibers or by draping fabrics produced with these fibers.

These fibers may for example comprise resin-impregnated carbon, glass, and/or Kevlar fibers.

The cylindrical sleeve is, for example, made from metal and may comprise raceways for receiving ball bearings. The cylindrical sleeve may also be made from composite materials, for example resin-impregnated carbon fibers and/or glass fibers, and comprise raceways designed, for example with metal inserts, to receive the ball bearings.

The object of the present disclosure is also a rotor comprising a hub and at least two blades. This rotor may for example be a lift rotor, an auxiliary anti-torque rotor or a forward propeller. The blades are as described previously, the longitudinal axis AXL of the cylindrical sleeve coinciding with a pitch axis of the blade. The rotor also comprises a connection with a degree of freedom to rotate about the longitudinal axis AXL, such as a pivot connection, between the hub and each cylindrical sleeve, in order to allow variations in the pitch of the blade. When the rotor rotates about the axis of rotation of the hub, the longitudinal axis of the blade also substantially coincides with a radial direction of the rotating rotor.

The rotor also comprises at least one rotational guide device respectively connecting each cylindrical sleeve and the hub, in order to provide the connection, with a degree of freedom to rotate about the longitudinal axis AXL, between the hub and each cylindrical sleeve. This rotational guide device comprises, for example, one or more angular contact ball bearings, needle bearings or roller bearings.

Each guide device may comprise, for example, an inner ring, an outer ring and rolling elements, such as balls, needles or rollers. The inner ring is then secured to a cylindrical sleeve and the outer ring is secured to the hub. The cylindrical sleeve may comprise, for example, a first stop device for the rotational guide device and its inner ring, in particular, along the longitudinal axis AXL, and the hub may comprise a second stop device for the rotational guide device and its outer ring, in particular, along the longitudinal axis AXL, in order to retain the whole blade when subjected to centrifugal force during rotation of the rotor.

The rotor according to the disclosure advantageously helps facilitate the installation and removal of the blade compared with existing solutions in which the mechanical stop is provided solely, for example, by balls of the guide device.

Each cylindrical sleeve may comprise a pitch lever for effecting the pitch variations of the blade. The pitch lever is eccentric on the cylindrical sleeve in relation to the longitudinal axis AXL.

By virtue of the rotor according to the disclosure, the stresses present at the blade root of each blade are advantageously taken up separately by the elements of the system for retention and for take-up of separate stresses of each blade, namely the stop, the anchoring device, the blade body, the cylindrical sleeve and the torsion box.

Moreover, the elements of the system for retention and for take-up of separate stresses of each blade essentially comprise composite materials and are loaded in the best conditions of use with respect to the orientations of the fibers constituting them, depending on the stresses taken up by each element. As a result, the dimensions and the weight of each of these elements of the system for retention and for take-up of separate stresses of each blade may be optimized, as may their mechanical strength.

Moreover, the risks of corrosion failure are also reduced, or indeed eliminated, by limiting the use of metal parts.

The rotor according to the disclosure therefore proposes a novel architecture for the connection between each blade and the hub and for the installation and removal of a blade. Moreover, the rotor according to the disclosure may also help improve the longevity of the blades.

BRIEF DESCRIPTION OF THE DRAWINGS

The disclosure and its advantages appear in greater detail in the context of the following description of embodiments given by way of illustration and with reference to the accompanying figures, in which:

FIG. 5 is a longitudinal cross-sectional view of the blade root of a blade of another rotor;

FIG. 6 is a first transverse cross-sectional view of the blade root according to FIG. 5; and FIG. 7 is a second transverse cross-sectional view of the blade root according to FIG. 5.

DETAILED DESCRIPTION

Elements that are present in more than one of the figures are given the same references in each of them.

Figure 1:
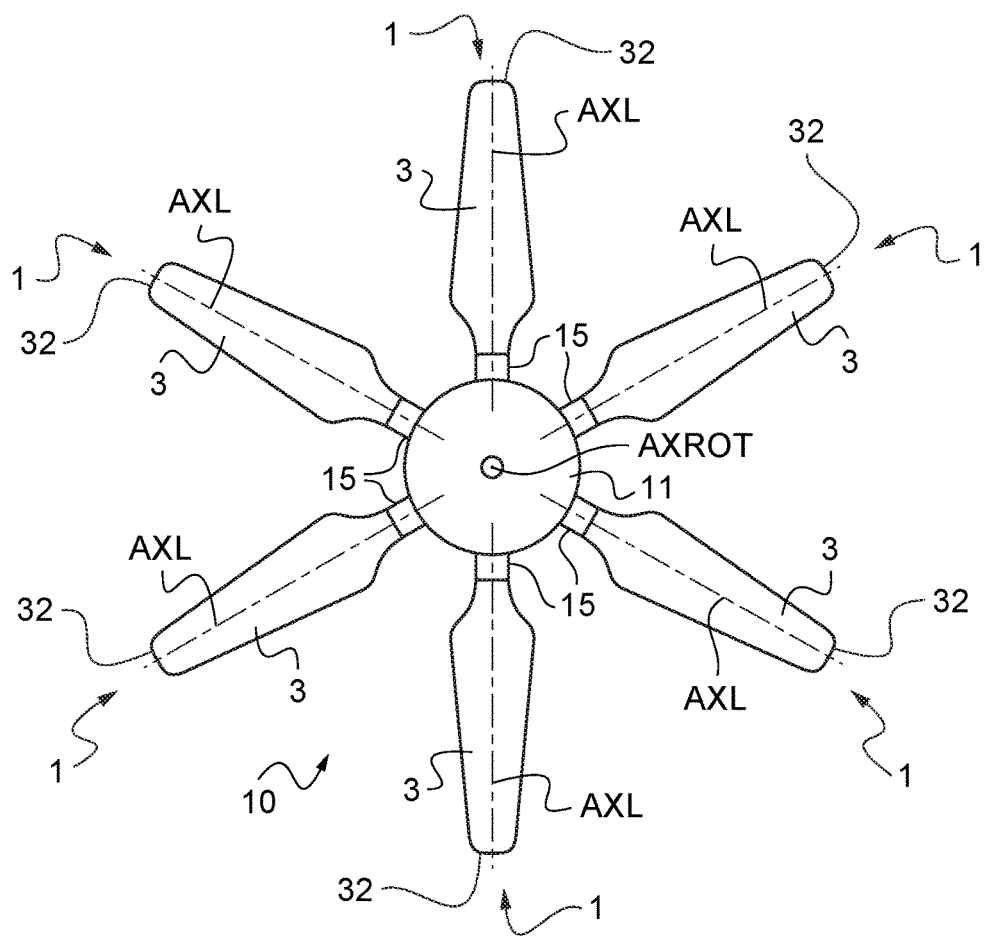
FIG. 1 is a view of a rotor provided with blades for an aircraft.

A rotor 10 for an aircraft is shown in FIG. 1. This rotor 10 comprises a hub 11, at least two blades 1 and an axis of rotation AXROT of the hub 11. The example of a rotor 10 shown in FIG. 1 comprises six blades 1, although a different number of blades 1 may be used without compromising the implementation of the disclosure. The example of a rotor 10 shown in FIG. 1 is a forward propeller of an aircraft intended to provide at least some of the forward motion the aircraft, which may be a fixed-wing and/or a rotary-wing aircraft. The rotor 11 may also be a lift rotor or an auxiliary anti-torque rotor of a rotary-wing aircraft.

Each blade 1 comprises a blade root 15, a profiled portion 3 and a free end 32, the profiled portion 3 being formed by a series of aerodynamic profiles. The longitudinal axis AXL of a blade 1 extends in a root direction from the blade root 15, fastened to the hub 11, towards the free end 32 of the blade 1.

When the rotor 10 rotates about the axis of rotation AXROT, the blades 1 are rotated by the hub 11 about this axis of rotation AXROT so that each blade 1, and more particularly the profiled portion 3 of each blade 1, generates an aerodynamic force. During such rotation of the rotor 10, the longitudinal axis AXL of each blade 1 substantially coincides with a radial direction of the rotating rotor 10 and hub 11. This radial direction extends perpendicular to the axis of rotation AXROT of the hub 11 around this axis of rotation AXROT.

Figure 2:
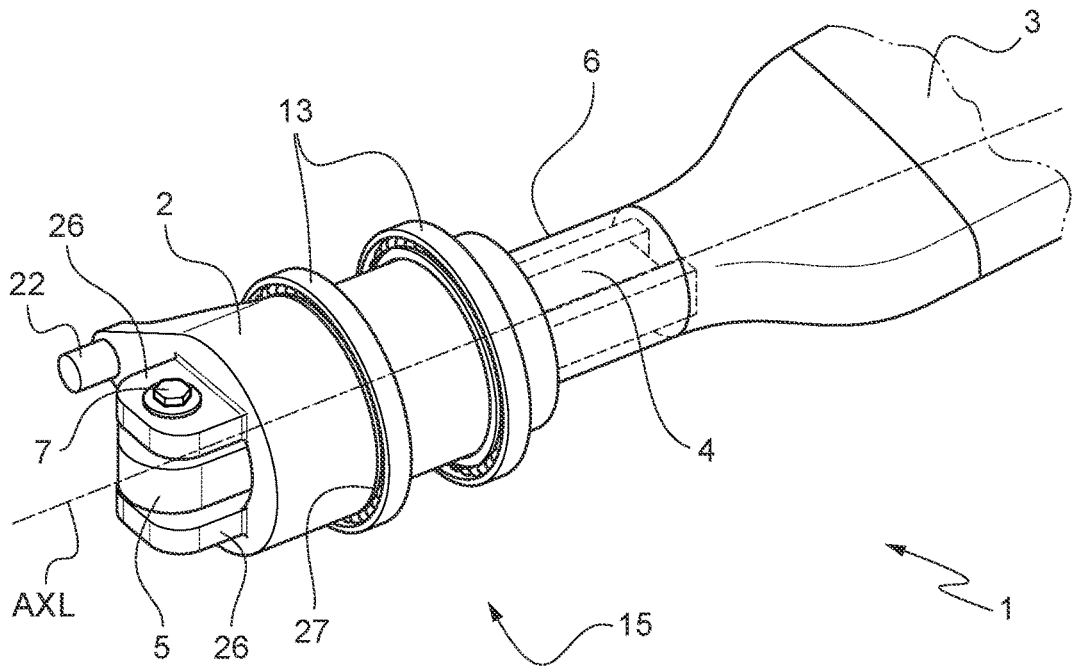
FIG. 2 is a view of a blade root of a blade of the rotor.

FIG. 2 shows, in detail, the blade root 15 and the junction with the profiled portion 3. The blade root 15 comprises a stop 7, an anchoring device 5, a blade body 4, a cylindrical sleeve 2 and a torsion box 6.

The torsion box 6, the anchoring device 5 and the blade body 4 are secured to the profiled portion 3. The torsion box 6, the anchoring device 5 and the blade body 4 may therefore be in continuation of the structure of the profiled portion 3, for example being secured to at least one spar of the blade 1. The torsion box 6, the anchoring device 5 and the blade body 4 may also be fastened to the structure of the profiled portion 3.

The cylindrical sleeve 2 is hollow and extends around the longitudinal axis AXL. The cylindrical sleeve 2 comprises an inner wall 25.

The torsion box 6 is hollow and extends around the longitudinal axis AXL. The torsion box 6 is positioned between the axis of rotation of the hub AXROT and the profiled portion 3. The torsion box 6 is positioned at least partially in the cylindrical sleeve 2.

The anchoring device 5 and the blade body 4 are positioned at least partially in the torsion box 6. The anchoring device 5 and the blade body 4 are also positioned at least partially in the cylindrical sleeve 2.

Moreover, in order to allow the blade 1 to rotate about a pitch axis that substantially coincides with its longitudinal axis AXL, at least one rotational guide device 13 is arranged between the cylindrical sleeve 2 and the hub 11, and more precisely a bore of the hub 11, in order to form a connection with a degree of freedom to rotate, such as a pivot connection, between the hub 11 and the cylindrical sleeve 2. For example, two guide devices 13, such as ball bearings, are positioned around the cylindrical sleeve 2. A guide device 13 may comprise, for example, an inner ring, an outer ring and rolling elements, namely balls in the example shown. According to another example, one or more angular contact ball bearings may be positioned around the cylindrical sleeve 2.

The cylindrical sleeve 2 may also comprise a first stop device 27 forming a stop parallel to the longitudinal axis AXL for an inner ring of a guide device 13. A first stop device 27 is, for example, a shoulder integrated into the cylindrical sleeve 2.

The bore of the hub 11 may also comprise a second stop device forming a stop parallel to the longitudinal axis AXL for an outer ring of a guide device 13. This second stop device may comprise a shoulder integrated into the bore of the hub 11 and/or be formed by one or more inserts.

The cylindrical sleeve 2 may further comprise a pitch lever 22, which is eccentric in relation to the longitudinal axis AXL, for controlling the pitch variation of the blade 1.

The anchoring device 5 is therefore positioned inside the cylindrical sleeve 2 and at least partially surrounds the stop 7 fastened to the cylindrical sleeve 2, so that the assembly formed by the stop 7 and the anchoring device 5 creates a longitudinal stop for the blade 1, in a direction parallel to the longitudinal axis AXL, and for the blade root 15, towards the free end 32 of the blade 1. This longitudinal stop prevents the blade 1 from moving under the effect of the centrifugal force applied to the blade 1 during rotation of the rotor 10 about the axis of rotation AXROT.

Figure 3:
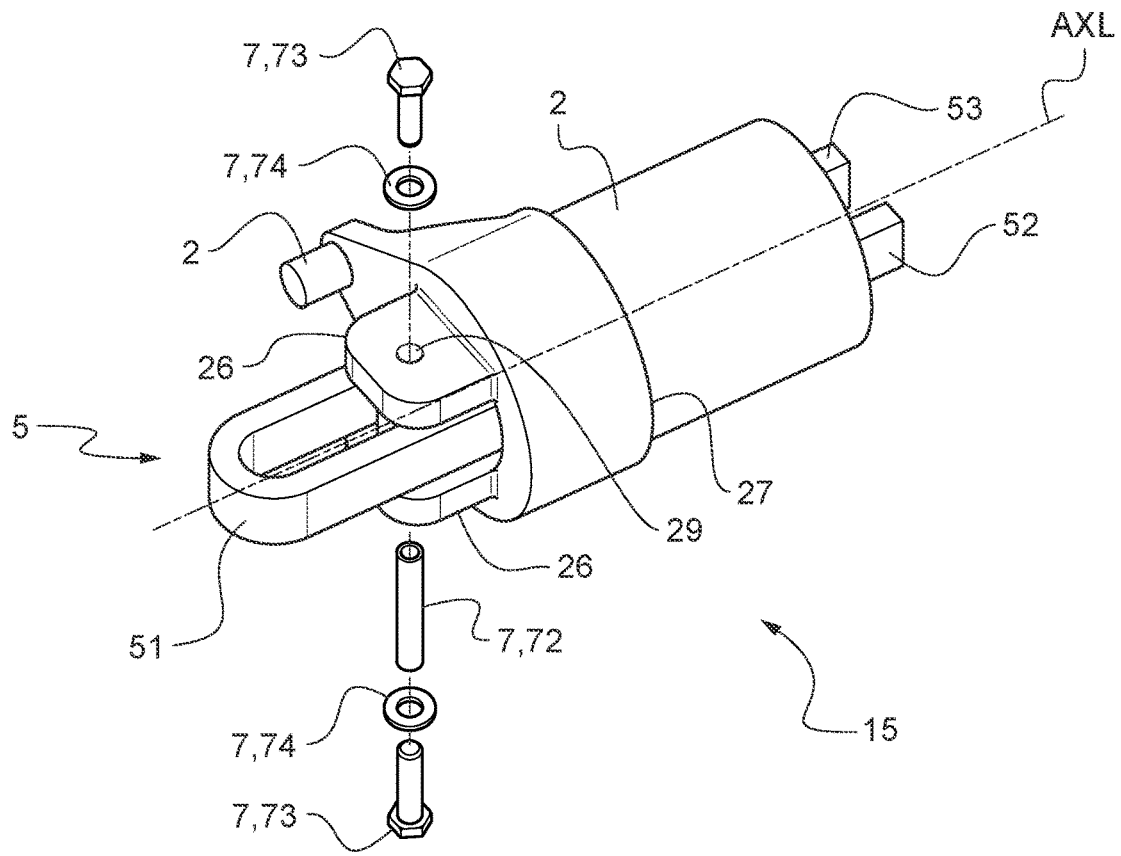
FIG. 3 is an exploded view of the blade root.

An example of a connection between the stop 7 and the anchoring device 5 is shown as an exploded view in FIG. 3. The anchoring device 5 surrounds the stop 7 over 180 degrees (180°) in order to create the longitudinal stop. The stop 7 comprises a cylindrical part 72 arranged perpendicular to the longitudinal axis AXL and the anchoring device 5 comprises a U-shaped end 51 in order to ensure form-fitting contact with the cylindrical part 72 and, therefore, good take-up of the stresses generated by the centrifugal force applied to the blade 1 during rotation of the rotor 10. The anchoring device 5 also comprises two arms 52,53 connecting the U-shaped end 51 to the profiled portion 3. The blade body 4 is positioned between the arms 52,53 and bears against each arm 52,53 in order to limit the deformations of the arms 52,53.

The cylindrical part 72 of the stop 7 is, for example, fastened between two supports of a clevis 26 of the cylindrical sleeve 2, each support of the clevis 26 comprising an aperture 29. The stop 7 may comprise at least one removable fastening device 73, such as a screw 73, for example, in order to fasten the cylindrical part 72 to each support of the clevis 26, the cylindrical part 72 comprising a tapped hole at each of its ends. A washer 74 may be interposed between a support and a fastening device 73.

Figure 4:
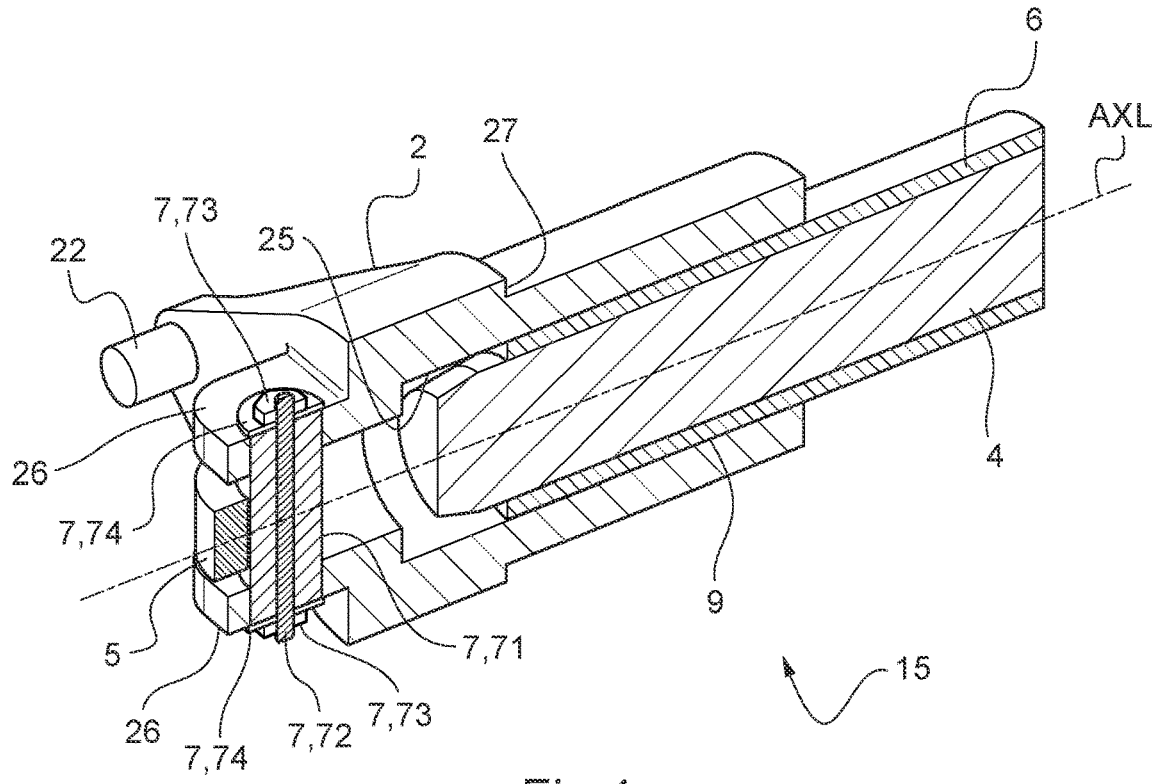
FIG. 4 is a longitudinal cross-sectional view of the blade root.

The stop 7 may also comprise, according to the example shown in FIG. 4, a hollow cylindrical bushing 71, a cylindrical part 72 and at least one removable fastening device 73. The bushing 71 and the cylindrical part 72 are arranged perpendicular to the longitudinal axis AXL. The bushing 71 is secured to the anchoring device 5 comprising a U-shaped end 51 in order to ensure form-fitting contact with the bushing 71 so as to take up the stresses generated by the centrifugal force applied to the blade 1 during rotation of the rotor 10. The anchoring device 5 also comprises two arms 52,53 connecting the U-shaped end 51 to the profiled portion 3.

The cylindrical part 72 is positioned in the bushing 71 and is fastened between two supports of the clevis 26 of the cylindrical sleeve 2, each support of the clevis 26 comprising an aperture 29. The stop 7 then comprises two removable fastening devices, such as two nuts 73, for example, in order to fasten the cylindrical part 72 to each support of the clevis 26, the cylindrical part 72 comprising a threaded rod at each of its ends. A washer 74 may be interposed between a support and a fastening device 73.

The blade body 4 and the anchoring device 5 are positioned inside the cylindrical sleeve 2 and the torsion box 6 as shown in FIG. 4. The torsion box 6 comprises a bearing zone 9 in contact with the inner wall 25 of the cylindrical sleeve 2.

This bearing zone 9, which is in contact with the inner wall 25 of the cylindrical sleeve 2, advantageously takes up the bending forces experienced by the blade 1 resulting from the aerodynamic forces experienced by the blade 1 during rotation of the rotor 10.

According to the example shown in FIG. 4, the bearing zone 9 of the torsion box 6 comprises a single cylindrical bearing surface around the longitudinal axis AXL and covering, along the longitudinal axis AXL, a length greater than the diameter of the inner wall 25, so as to form a "long centering" connection between the cylindrical sleeve 2 and the torsion box 6.

According to another example shown in FIG. 5, the bearing zone 9 of the torsion box 6 comprises two cylindrical bearing surfaces positioned along the longitudinal axis AXL.

Moreover, the blade body 4 may bear against the stop 7, and in particular against the bushing 71, in the example shown, along the longitudinal axis AXL.

FIG. 6 shows a cross-sectional view of the example of FIG. 5 perpendicular to the longitudinal axis AXL at a bearing surface of the bearing zone 9. The inner wall 25 of the cylindrical sleeve 2 may be cylindrical with a circular base and the bearing zone 9 may comprise, at least partially, a cylindrical shape with a circular base, as shown in FIG. 6, in order to form a connection with a degree of freedom to rotate about the longitudinal axis AXL and with a degree of freedom to move in translation along the longitudinal axis AXL, such as a sliding pivot connection, between the cylindrical sleeve 2 and the torsion box 6.

The anchoring device 5 and the blade body 4 are positioned at least partially in the torsion box 6, according to the example of FIG. 6, and in contact with an inner surface of the torsion box 6.

FIG. 7 shows a cross-sectional view of the example of FIG. 5 perpendicular to the longitudinal axis AXL and passing through an axis of the stop 7, in particular an axis of the bushing 71 and of the cylindrical part 72. According to this example, the blade body 4 comprises at least one flat spot 41 and specifically two flat spots 41 that are diametrically opposite in relation to the longitudinal axis AXL. Each support of the clevis 26 then comprises at least one planar face 61 cooperating respectively with one flat spot 41, and specifically two planar faces 61. These two planar faces 61 are thus in contact respectively with the two flat spots 41 so as to help take up the torsional stress generated by the aerodynamic forces experienced by the blade 1 during rotation of the rotor 11.

Other complementary shapes may be used for the blade body 4 and the cylindrical sleeve 2 in order to help take up this torsional stress. The blade body 4 and an internal shape of the cylindrical sleeve 2 may, for example, be parallelepiped or ovoid.

The stop 7, the anchoring device 5, the blade body 4, the cylindrical sleeve 2 and the torsion box 6 therefore separately take up the various stresses generated and experienced by the blade 1 during rotation of the rotor 11. The stop 7, the anchoring device 5, the blade body 4, the cylindrical sleeve 2 and the torsion box 6 may therefore form a system for retention and for take-up of separate stresses of the blade 1.

The stop 7, the anchoring device 5, the blade body 4, the cylindrical sleeve 2 and the torsion box 6 may therefore be advantageously optimized in terms of their dimensions, their weight and their mechanical strength, without compromising the operation and the mechanical resistance to stress and fatigue of the rotor 11 as a whole.

In the absence of such complementary shapes for the blade body 4 and the cylindrical sleeve 2, the torsional stresses generated by the aerodynamic forces experienced by the blade 1 during rotation of the rotor may be taken up by the stop 7 in connection with the cylindrical sleeve 2.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A blade for a rotor, the blade comprising:
a hollow cylindrical sleeve extending around a longitudinal axis and provided with an inner wall;
a stop fastened to the cylindrical sleeve;
a profiled portion;
an anchoring device secured to the profiled portion; and
a blade body secured to the profiled portion,
wherein the blade comprises a hollow torsion box secured to the profiled portion, and comprising a bearing zone in contact with the inner wall of the cylindrical sleeve;
the anchoring device is positioned inside the cylindrical sleeve and at least partially surrounds the stop;
the blade body is positioned inside the cylindrical sleeve; and
wherein the blade body comprises at least one flat spot and the cylindrical sleeve comprises at least one planar face cooperating with the at least one flat spot.

2. The blade according to claim 1,
wherein the anchoring device is U-shaped.

3. The blade according to claim 1,
wherein the anchoring device comprises unidirectional fibers.

4. The blade according to claim 1,
wherein the anchoring device and the blade body are secured to at least one spar of the blade.

5. The blade according to claim 1,
wherein the stop comprises a cylindrical part arranged perpendicular to the longitudinal axis and connecting the anchoring device to the cylindrical sleeve and at least one fastening device for fastening the cylindrical part to the cylindrical sleeve.

6. The blade according to claim 1,
wherein the stop comprises a hollow bushing secured to the anchoring device and a cylindrical part arranged perpendicular to the longitudinal axis and at least one fastening device for fastening the cylindrical part to the cylindrical sleeve, the anchoring device at least partially surrounding the bushing, the cylindrical part being positioned in the bushing in order to connect the anchoring device to the cylindrical sleeve.

7. The blade according to claim 1,
wherein the inner wall of the cylindrical sleeve is cylindrical with a circular base and the bearing zone of the torsion box comprises, at least partially, a cylindrical shape with a circular base cooperating with the inner wall to form a connection with a degree of freedom to rotate about the longitudinal axis and with a degree of freedom to move in translation along the longitudinal axis.

8. The blade according to claim 1,
wherein the torsion box comprises fibers oriented at angles of between ±10° and ±80° in relation to the longitudinal axis.

9. The blade according to claim 1,
wherein the at least one flat spot comprises two planar faces and a clevis, the clevis comprising two supports each provided with a planar face, the blade body flanking the anchoring device between the two planar faces.

10. The blade according to claim 1,
wherein the blade body bears against the stop along the longitudinal axis.

11. A rotor comprising:
a hub; and
at least two blades,
wherein the at least two blades are according to claim 1, the longitudinal axis of each cylindrical sleeve of the at least two blades coinciding with a pitch axis of a respective of the at least two blades, the rotor comprising a connection, with a degree of freedom to rotate about the longitudinal axis, between the hub and each cylindrical sleeve.

12. The rotor according to claim 11,
wherein the rotor comprises at least one rotational guide device by blade, and the at least one rotational guide device respectively connecting the cylindrical sleeve of the blade and the hub.

13. The rotor according to claim 12,
wherein the at least one rotational guide device comprises an inner ring, an outer ring and rolling elements, the inner ring being secured to the cylindrical sleeve and the outer ring being secured to the hub, the cylindrical sleeve comprising a first stop device and the hub comprising a second stop device along the longitudinal axis.

14. The rotor according to claim 11,
wherein each cylindrical sleeve comprises a lever for controlling pitch of the blade.

15. A blade for a rotor, the blade comprising:
a cylindrical sleeve extending around a longitudinal axis and having an inner wall;
a stop fastened to the cylindrical sleeve;
a profiled portion;
an anchoring device secured to the profiled portion; and
a blade body secured to the profiled portion,
a torsion box secured to the profiled portion and comprising a bearing zone in contact with the inner wall of the cylindrical sleeve;
the anchoring device disposed inside the cylindrical sleeve and at least partially surrounding the stop;
the blade body disposed inside the cylindrical sleeve; and
wherein at least one of the blade body and the cylindrical sleeve comprises at least one planar face cooperating with at least one flat spot of the other of the blade body and the cylindrical sleeve.

16. The blade according to claim 15,
wherein the anchoring device is U-shaped and comprises unidirectional fibers.

17. The blade according to claim 15,
wherein the anchoring device and the blade body are secured to at least one spar of the blade.

18. A blade for a rotor, the blade comprising:
a hollow cylindrical sleeve extending around a longitudinal axis and having an inner wall;
a stop fastened to the cylindrical sleeve;
a profiled portion;
an anchoring device secured to the profiled portion; and
a blade body secured to the profiled portion,
a hollow torsion box secured to the profiled portion and comprising a bearing zone in contact with the inner wall of the cylindrical sleeve;
the anchoring device is inside the cylindrical sleeve and at least partially surrounds the stop; and
the blade body is inside the cylindrical sleeve,
wherein at least one of the blade body and the cylindrical sleeve comprises at least one planar face cooperating with at least one flat spot of the other of the blade body and the cylindrical sleeve.

* * * * *